March 27, 1956 R. E. FRINK 2,740,021
CIRCUIT INTERRUPTER
Filed July 22, 1950 6 Sheets-Sheet 2

WITNESSES:
N. F. Susser.
W. R. Crout

INVENTOR
Russell E. Frink
BY Ralph H. Swingle
ATTORNEY

March 27, 1956 R. E. FRINK 2,740,021
CIRCUIT INTERRUPTER
Filed July 22, 1950 6 Sheets-Sheet 3

WITNESSES:
H. F. Susser
W. R. Crout

INVENTOR
Russell E. Frink
BY Ralph H. Swingle
ATTORNEY

March 27, 1956 R. E. FRINK 2,740,021
CIRCUIT INTERRUPTER
Filed July 22, 1950 6 Sheets-Sheet 4

WITNESSES:
H. F. Susser.
W. R. Crouit

INVENTOR
Russell E. Frink
BY
Ralph H. Swingle
ATTORNEY

March 27, 1956

R. E. FRINK 2,740,021

CIRCUIT INTERRUPTER

Filed July 22, 1950

WITNESSES:
H. F. Sussex.
W. R. Crout.

INVENTOR
Russell E. Frink

BY
Ralph H Swingle
ATTORNEY

March 27, 1956

R. E. FRINK 2,740,021

CIRCUIT INTERRUPTER

Filed July 22, 1950

WITNESSES:
H. F. Susser
W. R. Crout

INVENTOR
Russell E. Frink
BY
Ralph H. Swingle
ATTORNEY

United States Patent Office 2,740,021
Patented Mar. 27, 1956

2,740,021

CIRCUIT INTERRUPTER

Russell E. Frink, Pittsburgh, Pa., assignor to Westinghouse Electric Corporation, East Pittsburgh, Pa., a corporation of Pennsylvania Application July 22, 1950, Serial No. 175,333

26 Claims. (Cl. 200—149)

This invention relates to circuit interrupters in general, and more particularly to arc-extinguishing structures therefor.

A general object of my invention is to provide an improved arc-extinguishing structure for a circuit interrupter, one particularly of the spaced plate type, in which more effective arc-extinguishing action is obtained than has been obtained heretofore.

A further object of my invention is to provide an improved spaced plate type of arc chute for a circuit interrupter in which the plate configuration is of improved construction and in which the deionizing activity is rendered more highly effective.

Another object of my invention is to provide an improved arc chute construction of the interleaving fin type, in which more effective cooling and deionization of the arc stream is effected.

Further objects and advantages will readily become apparent upon reading the following specification taken in conjunction with the drawings in which.

Figure 1:
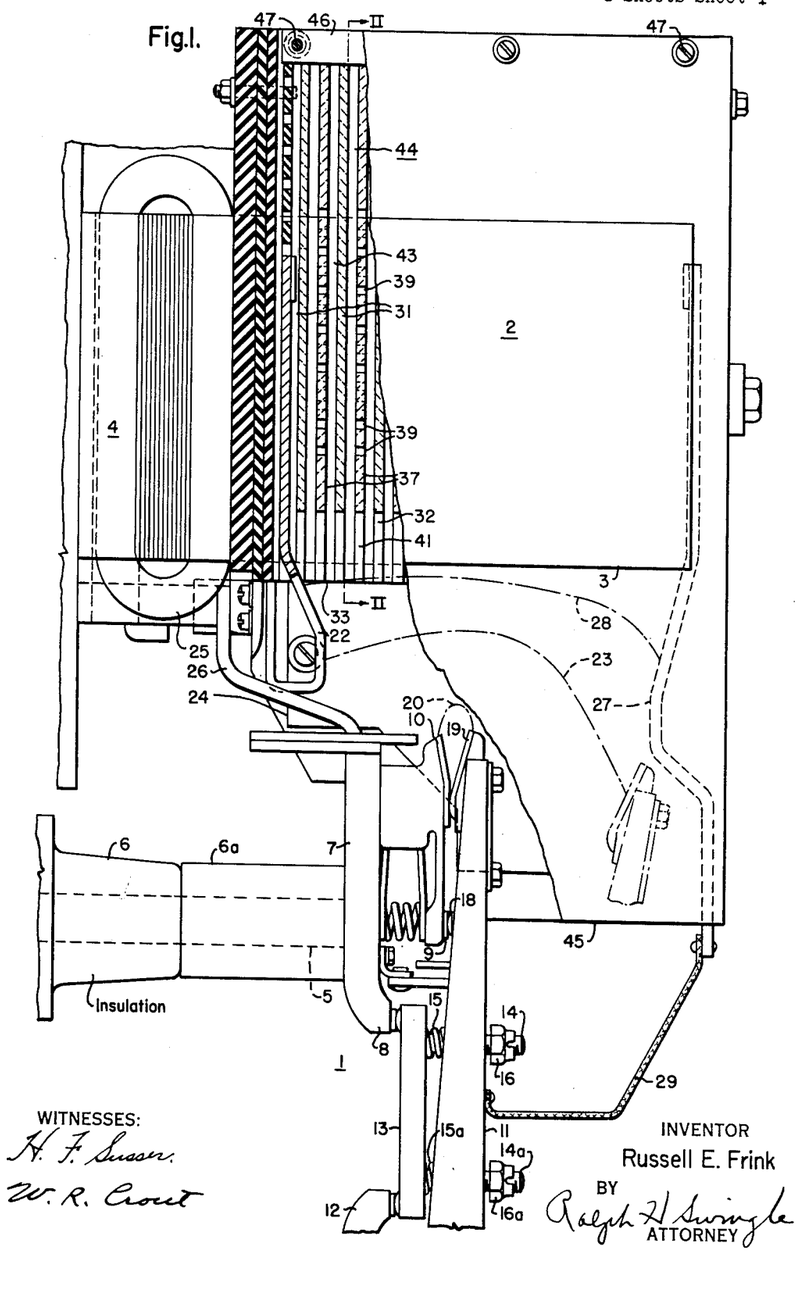
Figure 1 is a side elevational view, partially in vertical section, of a circuit interrupter embodying my invention, the contact structure being shown in the closed circuit position.

Referring to the drawings, and more particularly to Figure 1 thereof, the reference numeral 1 designates generally contact structure separable to establish an arc, which is moved upwardly into the arc chute 2 by a transverse magnetic field set up between the pole plates 3 by a suitable blowout structure 4.

More specifically, the contact structure 1 comprises a terminal stud 5 shrouded by insulating bushing 6, 6a and supporting a main contact plate 7. The contact plate 7 in turn supports a main stationary contact 8, a relatively stationary secondary contact 9, and a relatively stationary arcing contact 10.

Pivotally mounted adjacent the other terminal stud of the interrupter, not shown, and electrically connected thereto, is a main rotatable contact arm 11, adapted for swinging movement. The lower terminal stud for the interrupter, not shown, supports a contact plate, similar to the main contact plate 7, which in turn supports a second main stationary contact 12. Carried with the movable contact arm 11 is a conducting bridging plate 13 which, in the closed circuit position of the interrupter, electrically interconnects the main stationary contacts 8, 12. The bridging plate 13 is supported upon the rotatable main contact arm 11 by a pair of studs 14, 14a, encircling which are disposed compression springs 15, 15a, which provide the desired contact pressure in the closed circuit position of the interrupter. Nuts 16, 16a are threadedly secured to the right-hand ends of the studs 14, 14a to limit the leftward movement of the bridging plate 13 with respect to the main moving contact arm 11.

Also movable with the rotatable moving contact arm 11 is a movable secondary contact 18 and a movable arcing contact 19. It will, therefore, be apparent that during the opening operation of the interrupter, the clockwise opening rotative movement of the main moving contact arm 11 will first cause a separation between the conducting bridge 13 and the main stationary contacts 8, 12 to force the current to pass through the secondary and arcing contacts 9, 18 and 10, 19, respectively.

Further clockwise opening rotative movement of the movable contact arm 11 causes a separation between the secondary contacts 9, 18, thereby forcing the current to traverse the arcing contacts 10, 19, which separate last. Upon the subsequent separation of the arcing contacts 10, 19, as a result of continued clockwise rotation of the contact arm 11, an arc 20 is established therebetween.

Because of the loop circuit including the two terminal studs and the moving contact arm 11, the arc initially drawn, 20, will tend to expand so that a portion of it will contact the left-hand arc horn 22, as indicated by the broken line 23. This action is furthermore intensified by the provision of a venting aperture 24 provided out of the arc chute 2 immediately below the left-hand arc horn 22.

When the arc 23 contacts the arc horn 22, it causes the blowout coil 25 to be inserted into series circuit, so that the circuit now includes terminal stud 5, contact plate 7, conductor 26, blowout coil 25, arc horn 22, the arc 23, and through the movable contact arm 11 to the lower terminal stud for the interrupter, not shown.

Continued clockwise rotation of the movable contact arm 11 causes the arc 23 to transfer to the right-hand arc horn 27 so that the position of the arc is now indicated by the dotted line 28. The right-hand arc horn 27 is electrically connected by a flexible conductor 29 to the movable contact arm 11, as is customarily done in circuit interrupters of this type.

The energization of the blowout coil 25 of the blowout structure 4 sets up a transverse magnetic field 30 between the pole plates 3. It will be observed, with reference to Fig. 2, that the arc chute 2 is actually disposed between the pole plates 3, so that the magnetic field 30 tends to force the established arc 28 upwardly into the plate structure where it will be extinguished in a manner subsequently to be explained.

The theoretical explanation of the improved functioning of my improved plate structure will now be set forth. In arc chutes of the type herein concerned with, it has been customary to provide a plurality of rectangularly-shaped, spaced, ceramic, non-gas-evolving plates with tapered slots extending upwardly from their lower edges, and with the upper closed ends of the slots being offset from the center line of the plate. The plates have been assembled with the closed ends alternately offset so as to form a horizontally disposed zigzag arc passage throughout the chute. United States Patent 2,442,199, issued May 25, 1948, to Robert C. Dickinson and Russell E. Frink, and assigned to the assignee of the instant application, shows an arc chute of this general type and character.

It has been found that considerable improvement can be obtained by giving the closed ends of the slots considerable offset. Referring to the aforementioned patent, it will be seen that the net length of the arc at right angles to the magnetic field is equal to the length of the arc chute $l$ while the total length of the arc L is equal to $l$, the length of the stack, plus the product of the number of plates $n$ and the offset $o$. The offset $o$ is here taken to be the total lateral distance between the closed ends of the slots of two immediately adjacent plates, or $$L = l + no \qquad (1)$$

However, the magnetic force tending to drive the arc up into the slots is produced by the interaction of the magnetic field and the component of the arc at right angles to the field, or $$F = KBl \qquad (2)$$

where F is the force acting on the arc, B is the field strength, $l$ is the length of the arc at right angles to the field, and K is a proportionality constant depending on the units used. On the other hand, the factors which tend to prevent the arc from rising, i. e., the rate of increase of arc length per unit length of slot, the back pressure due to resistance to gas flow, are proportional to the length of the arc L.

For given values of magnetic field, arc current, plate thickness and spacing, there is a maximum value of $o$ beyond which the arc will not rise in the slots. With a current of approximately 25,000 amperes, plate thickness and spacing of ⅛ inch and the field strength practical to obtain with conventional blowout magnet arrangements, it has been found that the maximum offset $o$ that can be used is of the order of one inch. Thus, if the plate thickness $d$ is ⅛ inch and the plate spacing $s$ is also ⅛ inch, such a "section" including one plate and its spacing $(d+s)$ will amount to ¼ inch. Since the maximum offset $o$ is 1 inch, this means that the total length of the arc for such a "section" will be ¼ inch plus 1 inch, or 5/4 inch, or $$L = \Sigma(d+s) + o \qquad (3)$$

or $$L = \Sigma(d+s) + 4(d+s) \qquad (4)$$

which leads to $$L = \Sigma 5(d+s) \qquad (5)$$

or $$L = 5l \qquad (6)$$

substituting in Equation 1:

$$5l = l + no \qquad (7)$$

$$no = 4l \qquad (8)$$

From Equation 8 if $n$ is reduced by 50%, $l$ remaining the same, $o$ can be doubled. (It is not definitely known that Equation 8 is rigorously correct, but experiments have shown it to be satisfactory for practical purposes.) However, when $n$ is decreased, the over-all voltage interrupting ability of the stack is also decreased because there are fewer plate edges exposed to the arc, and dielectric strength builds up faster at these edges than elsewhere along the arc path, and also perhaps for other reasons.

My improved structure will now be described in which advantage is taken of the increased offset $o$ and decreased number of offsets $n$ in such a way to more than compensate for the loss in capacity so that an over-all net increase will be realized.

Figure 3:
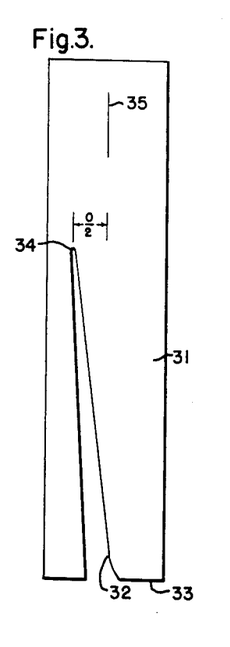
Figs. 3 and 4 are side views of plate details utilized in the construction of the arc chute shown in Figs. 1 and 2.

The plate structure for the arc chute 2 will now be described. The arc chute 2 is made up of a plurality of insulating plates 31, shown more clearly in Fig. 3, each having a tapered, elongated slot 32 extending upwardly from the lower edge 33 and with the upper closed end 34 being offset a distance O/2 from the center line 35 of the plate 31.

Figure 4:
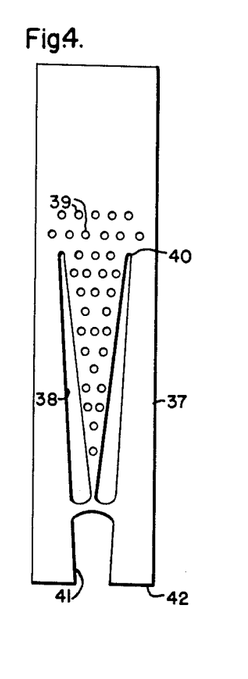

The plates 31 may have a greatly increased offset $o$ of approximately 2 inches and a thickness of ⅛ inch. Intermediate insulating plates or splitters 37 are preferably made as in Fig. 4. The plate 37, as will be apparent from Fig. 4, includes a pair of diverging slots 38, diverging in an upward direction with a plurality of apertures 39 disposed therebetween. In my preferred construction, the apertures 39 extend above the upper closed ends 40 of the slots 38. A small slot or notch 41 is also provided extending upwardly from the lower edge 42 of the plate 37, as shown in Fig. 4.

The arc chute construction 2 consequently includes a plate 31 with the offset to the left, a plate 37, a plate 31 with the offset to the right, a plate 37, a plate 31 with the offset to the left, a plate 37, etc., until the desired length of the arc chute 2 is obtained. All the plates 31, 37 are stacked with ⅛ inch spacing between the plates. Preferably, this spacing consists of strips of asbestos rope 43 which is cemented to the plates 31, 37 so that the plates 31 and 37, together with the asbestos rope 43, forms a unitary sub-assembly 44, which being an integral unit may be bodily placed downwardly within the arc chute housing or jacket 45, the latter being preferably of a rectangular shape.

Figure 2:
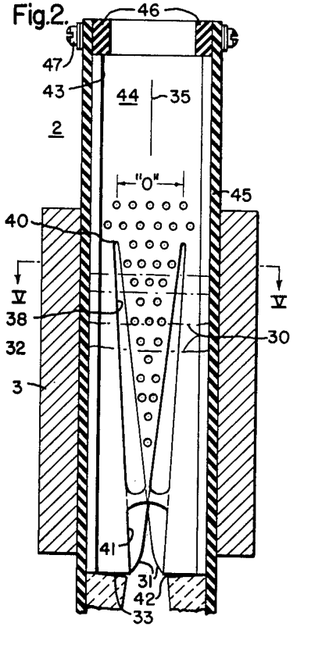
Fig. 2 is a fragmentary, vertical sectional view taken along the line II—II of Figure 1, looking in the direction of the arrows.

After the sub-assembly 44 has been placed downwardly within the arc chute housing 45, a pair of insulating spacer strips 46 are provided at the upper end of the arc chute 2, as shown in Fig. 2, being secured to the upper edges of the housing 45 by screws 47. The spacer strips 46 prevent the gas pressure from blowing the arc chute sub-assembly 44 out of the arc chute 2, and hold the latter in a fixed position. Moreover, the construction is such that the sub-assembly 44 may be replaced when necessary.

Figure 5:
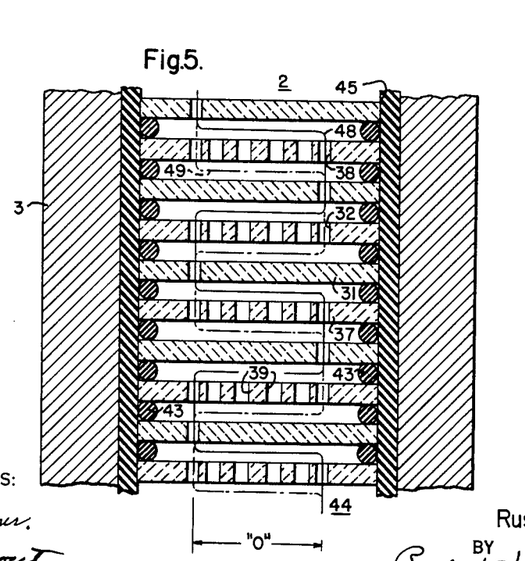
Fig. 5 is an enlarged, fragmentary, plan view in section taken along the line V—V of Fig. 2, looking in the direction of the arrows.

Referring to Fig. 5, which shows in enlarged fashion, a fragmentary horizontal section through the arc chute 2 along the line V—V of Fig. 2, it will be observed that when the arc 23 has reached the top of the slots 32, 38 it will be in the position as shown in Fig. 5, and will either take the position shown by the solid line 48 or the broken line 49. In either case, if the arc travels over the distance o, it is exposed to the intermediate splitter plates 37, and ionized gas will escape through the perforations 39 into the space on the other side of the intermediate plate 37. These perforations 39 will also cause turbulence of the arc gases which assist in deionization. Also around each aperture an edge is exposed which forms a point for initial build up of dielectric strength. It will also be observed that the arc travels over as many actual plate edges as it did when each plate was made like plate 31 except that the offset was only one inch. The net over-all result is that with this structure the arc is as long as before, travels over the same number of plate edges, and at the same time the deionization action along its length is enhanced.

Figure 6:
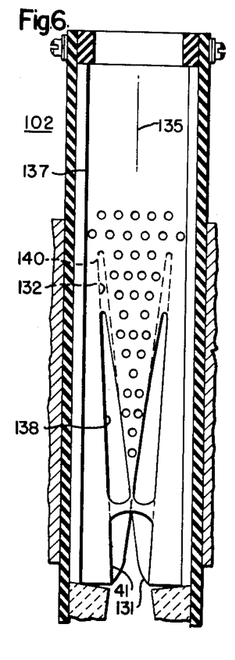
Fig. 6 is a vertical sectional view through a modified type of arc chute in which the length of the slots of the regular plates is longer than the length of the slots provided by the intermediate plates.

It is to be clearly understood that the length of the slots 38 in the intermediate plates 37 need not be coterminous with the slot length in the regular slotted plates 31. For example, Fig. 6 is a vertical sectional view taken through a modified type arc chute, generally designated by the reference character 102. It will be noted that the intermediate insulating plate 137 is shown in side elevation with the slots 138 being shorter than the slots 132 of the regular slotted plates 131. As before, the regular plates 131 have the upper closed ends 140 of the slots 132 staggered about the center-line 135 of the modified type of arc chute 102. Deionization with this construction is enhanced since the serpentine arc stream is compelled to assume a greater length vertically than would otherwise be the case.

Figures 7, 8:
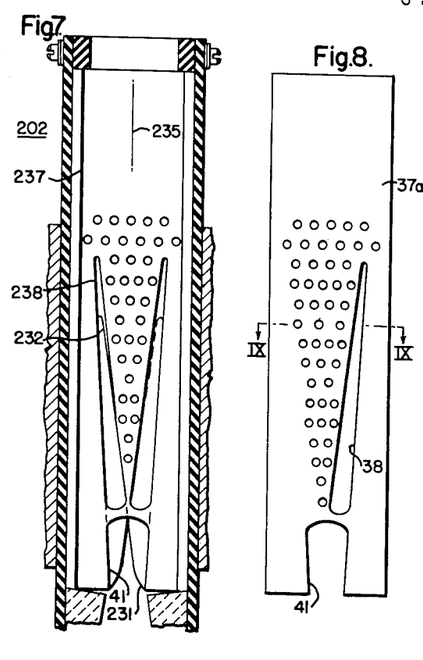
Fig. 7 is a vertical sectional view through a further modified type of arc chute in which the length of the slots in the intermediate plates is longer than the length of the slots in the regular slotted arc extinguishing plates.
Fig. 8 is a side elevational view of a modified type of intermediate plate having only a single slot provided therein.

Fig. 7 is a vertical sectional view taken through a further modified type of arc chute, generally designated by the reference character 202. Here, the length of the slots 238 in the intermediate plates 237 is greater than the length of the slots 232 in the regular slotted arc extinguishing plates 231. As before, the regular slotted plates 231 are staggered about the center line 235 of the modified type of arc chute 202. In certain applications this construction has the advantage of compelling the arc stream to be lengthened vertically, as well as horizontally, as it moves upwardly toward the closed ends of the slots 232, 238 respectively in the plates 231, 237.

For certain applications it may be desirable, instead of having a pair of diverging slots 38 in the intermediate plates 37, as shown in Fig. 4, to have only a single slot 38 provided in the intermediate plates 37a, 37b. In other words, Fig. 8 illustrates a possible construction of an intermediate plate 37a, which could take the place of the intermediate plate 37 of Fig. 4 in the arc chute 2 of Figs. 1 and 2. If this were done, a plan view, in section, taken along the line IX—IX of the plates, as indicated in Fig. 8, would result in the construction, as shown in Fig. 9 of the drawings.

Figure 9:
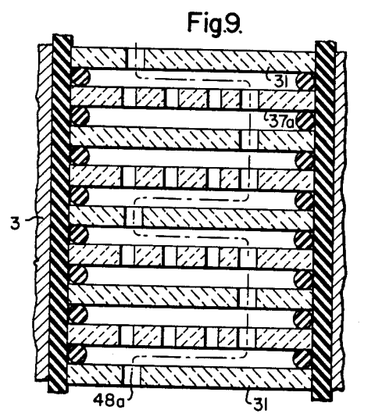
Fig. 9 is a plan view, in section, of a modified type of arc chute taken substantially along the line IX—IX of Fig. 8, looking in the direction of the arrows.

Referring to Fig. 9, it will be noted that the arc is compelled to take the path indicated by the dotted line 48a.

Figure 10:
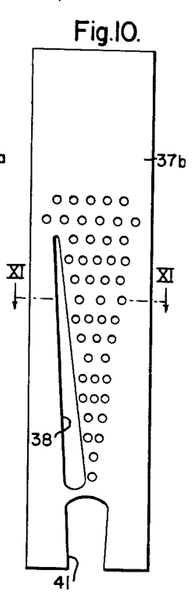
Fig. 10 is a side elevational view of a modified type of intermediate plate having only a single slot provided therein.
Figure 11:
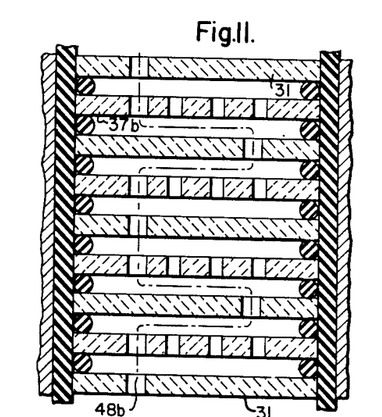
Fig. 11 is an enlarged view, in section, of a modified type of arc chute taken substantially along the line XI—XI of Fig. 10, looking in the direction of the arrows.

In certain applications the intermediate plates may assume the form shown in Fig. 10, having only a single slot 38 provided therein. If such a modified type of intermediate plate 37b is substituted for the intermediate plates 37 of Fig. 4, in the arc chute 2 of Figs. 1 and 2, the result will be as shown in Fig. 11. More specifically, Fig. 11 is an inverted plan view, in section, taken along the line XI—XI through an assembly of plates of the type shown in Figs. 3 and 10. Here, the arc will be compelled to assume the path indicated by the dotted line 48b.

A modification of my invention as applied to lower voltage air breakers used on very high currents, and particularly suitable for direct-current applications, will now be described. These interrupters are essentially arc-voltage-generating devices, and at very high currents temperatures may be developed, which, even with the best materials, causes very rapid deterioration.

It has been shown that when an arc is confined to a narrow slot, the arc voltage is inversely proportional to the width of the slot. In conventional designs the required arc voltage is obtained by forcing the arc up into V-shaped slots in plates placed at right angles to the arc, the ends of the slots being substantially lined up. The required arc voltage is obtained by making the upper parallel portion of the slot comparatively narrow, say ⅛ inch wide and the result is a very hot local spot in the plate and the rest of it is practically unused.

Figure 12:
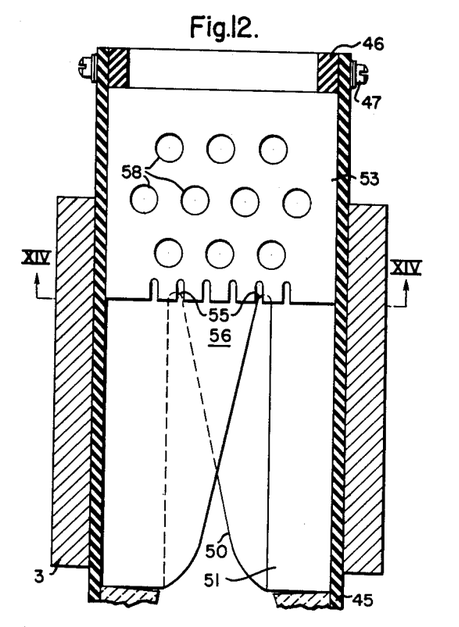
Fig. 12 is a fragmentary, vertical sectional view taken through a modified type of arc chute embodying the principles of my invention.
Figure 13:
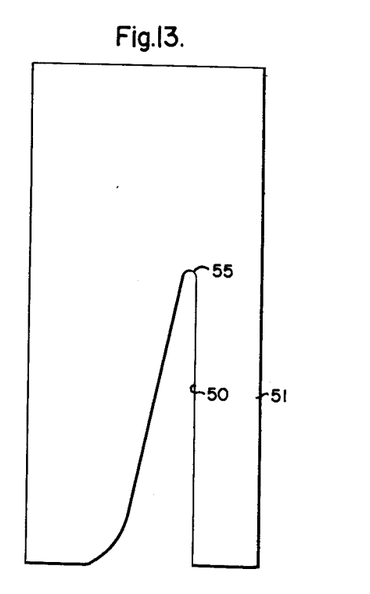
Fig. 13 is a side view of a plate detail utilized in the construction of the arc chute of Fig. 12.
Figure 14:
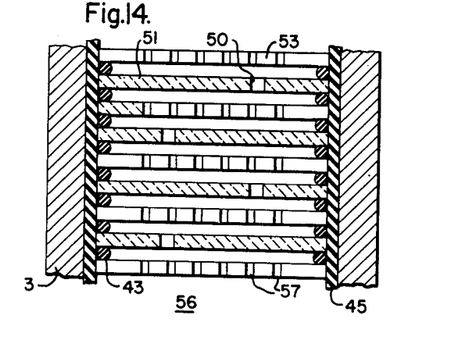
Fig. 14 is a fragmentary, inverted plan view in section, taken along the line XIV—XIV of Fig. 12, looking in the direction of the arrows.
Figure 15:
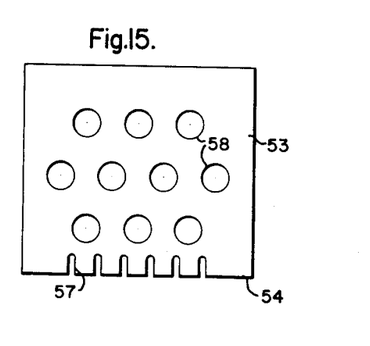
Fig. 15 is a side view of an intermediate plate detail utilized in the construction of the arc chute of Figs. 12 and 14.

I have discovered that if the plates are made with a gradually tapered slot, such as designated at 50 in Fig. 13, and if the plates 51 are spaced much farther apart, say of the order of ½ inch, the result is that the arc voltage per unit length is much lower and the temperature also is much lower. The required arc voltage to interrupt the circuit is obtained by increased arc length. If this was all that were done and the plates were spaced ½ inch apart, the arc would go right on out of the top of the stack. However, intermediate insulating splitters, designated by the reference character 53 of Fig. 15, are preferably provided and are placed between the insulating interrupter plates 51. Preferably, however, they do not extend down into the arcing space, but have their lower edges 54 adjacent the plane which interconnects the closed ends 55 of the several plates 51, as shown more clearly by the assembly view of Fig. 12.

Referring to Fig. 12, it will be noted that again the pole plates 3 are utilized together with the insulating strips 46 to keep such a sub-assembly 56, including the plates 51 and the splitter plates 53, in place. It will furthermore be noted, referring particularly to Fig. 15, that the lower edge 54 of the plates 53 is notched, as at 57, to break up current leakage through the heated surface. Also preferably, such plates 53 have a plurality of apertures 58 extending therethrough. The perforated insulating splitter plates 53 will deionize the hot gases escaping upwardly from the arc and will prevent reignition over the top and also assist in deionizing the arc as it is forced against the lower edges 54. The over-all result is that the required arc voltage is generated, but the arc temperature is kept lower, and the total heat which is generated is spread evenly over a large area and much longer life is obtained.

From the foregoing, it will be apparent that I have provided an improved arc chute construction, particularly adapted for circuit interrupters of the air-break type in which improved deionizing conditions are obtained by the use of novel plate configurations as has been described. The embodiment set forth in Figs. 12–15 illustrates an application of the principles of the invention as applied to low voltage, high current applications particularly suitable for direct current installations.

It is to be clearly understood that certain features of my invention are not exclusively applicable to the type of air-break circuit interrupter illustrated in Figs. 1–9, but may also be utilized in an arc chute of the interleaving fin type. In such an interleaving fin type of arc chute, the construction is such that fins are preferably integrally formed with the insulating side walls, and are assembled in an interleaving relationship. The result is that the arc, upon being forced upwardly into the arc chute by a transverse magnetic field, will be caused to assume a zig-zag or serpentine configuration. My invention will now be described as applied to such a modified type of arc chute.

Figure 16:
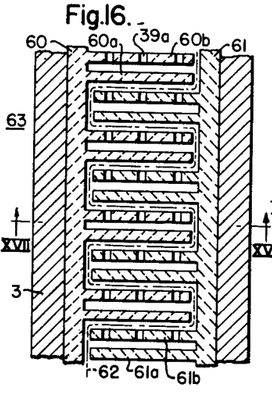
Fig. 16 is a plan view in section of a modification of my invention, taken along the line XVI—XVI of Fig. 17, looking in the direction of the arrows.
Figure 17:
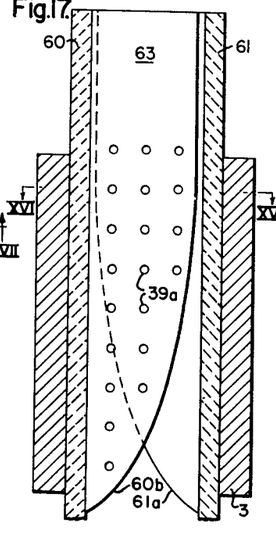
Figure 17 is a vertical sectional view taken along the line XVII—XVII of Fig. 16.

The modified construction set forth in Figs. 16 and 17 utilizes a pair of opposed wall members 60, 61, having respectively interleaving fins 60a, 61a. This is the usual construction in such a type of interleaving arc chute arrangement. However, my structure is different by employing additional perforated insulating fins 60b, 61b, as clearly shown in Figs. 16 and 17.

It will be observed that the several fins, with reference to Fig. 17, progressively extend into the arc chute until the outer side extremity of the fin near the top of the arc chute approaches closely the opposite wall member. The perforations 39a of the fins 60b, 61b have the same function as the apertures or perforations 39 of the intermediate plates 37 of Fig. 4.

The result of such a modified construction is that the arc is compelled to assume a configuration more clearly indicated by the broken line 62 of Fig. 16. In other words, the length of the arc parallel to the magnetic field may be increased by employing fewer fins, since the fins 60b, 61b do not cause the arc to reverse its direction. These fins 60b, 61b cause the arc to intimately engage the cool side wall surfaces which are broken up by the apertures 39a. The net result is more efficient arc extinction, and faster movement of the arc 62 upwardly within the modified type of arc chute 63.

Figure 18:
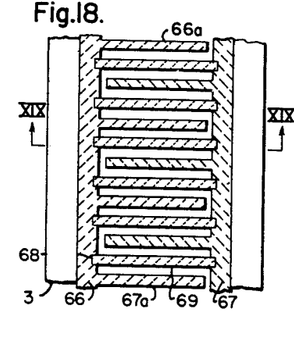
Fig. 18 is a further modification of my invention taken along the line XVIII—XVIII of Fig. 19, looking in the direction of the arrows.
Figure 19:
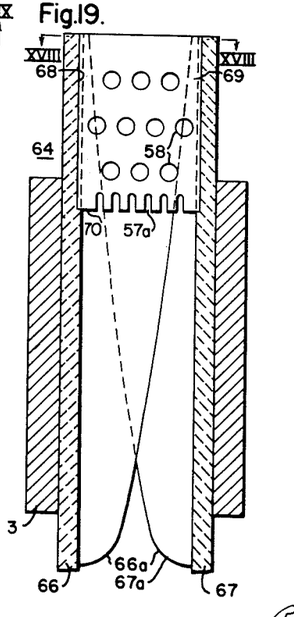
Fig. 19 is a vertical sectional view taken along the line XIX—XIX of Fig. 18.
Figure 20:
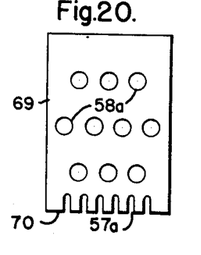
Fig. 20 is a side elevational view of a plate detail utilized in the construction shown in Figs. 18 and 19.

The modification of my invention set forth in Figs. 18–20 illustrates an application of the principles, previously set forth in connection with Figs. 12–15, to an interleaving type of arc chute. The modified type of arc chute 64 utilizes a pair of cooperating opposed insulating wall members 66, 67 having respectively fins 66a, 67a integrally formed therewith. The fins 66a, 67a interleave with each other so as to cause an arc, in moving upwardly, to assume a zigzag or serpentine form. It will be observed that the wall members 66, 67 have grooves 68 preferably molded therein to support intermediate insulating splitter plates 69, the configuration of which is more clearly shown in Fig. 20 of the drawings. Referring to Fig. 20, it will be observed that the intermediate plates 69 have notches 57a provided at their lower edges 70, and apertures 58a also provided therein.

Upon the assembly of the modified type of arc chute 64, by placing the intermediate plates 69 within the grooves 68 of the wall members 66, 67, the resulting arrangement forms an effective arc chute which operates upon the principles previously set forth in connection with Fig. 12. In other words, the number of interleaving fins is diminished and the offset increased, with the intermediate perforated insulating splitter plates 69 preventing the arc from blowing upwardly out of the arc chute 64. As before, the apertures 58a cool the arc gases and the notches 57a provide an irregular surface which prevents leakage or breakdown across the lower edge 70 of the intermediate plates 69.

The modified construction set forth in Figs. 21–23 will now be explained. This construction utilizes wall members 66, 67 which may be identical to those set forth in Figs. 18 and 19, having the notches 68 provided therein. However, in place of utilizing intermediate plates 69 of Fig. 20, as was done in the construction of Figs. 18 and 19, instead, intermediate insulating plates indicated at 71 of Fig. 22 are employed.

Figure 22:
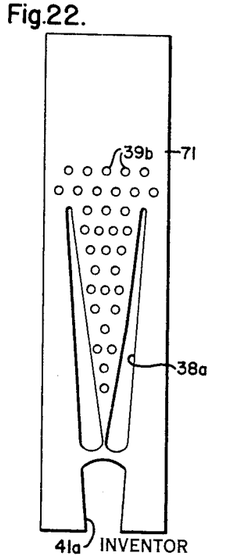
Fig. 22 is a side elevational view of a plate detail utilized in the construction set forth in Figs. 21 and 23.

Referring to Fig. 22, it will be observed that the intermediate plate 71 has a configuration similar to that of intermediate plates 37 of Fig. 4. In other words, two diverging slots 38a are employed, diverging in an upward direction. Also, a recess or notch 41a is employed in the plate 71 together with a plurality of apertures 39b.

Figure 21:
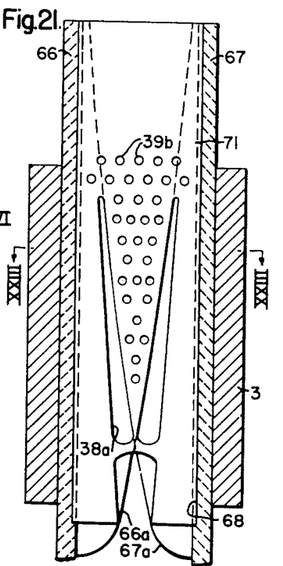
Fig. 21 is a further modification of my invention, being a vertical sectional view taken along the line XXI—XXI of Fig. 23.

Upon assembling the intermediate plates 71 within the grooves 68 provided on the inner wall surfaces of the opposed wall members 66, 67, a construction results, which is more clearly shown in Fig. 21.

Figures 23, 24, 25, 26, 27, 28, 29:
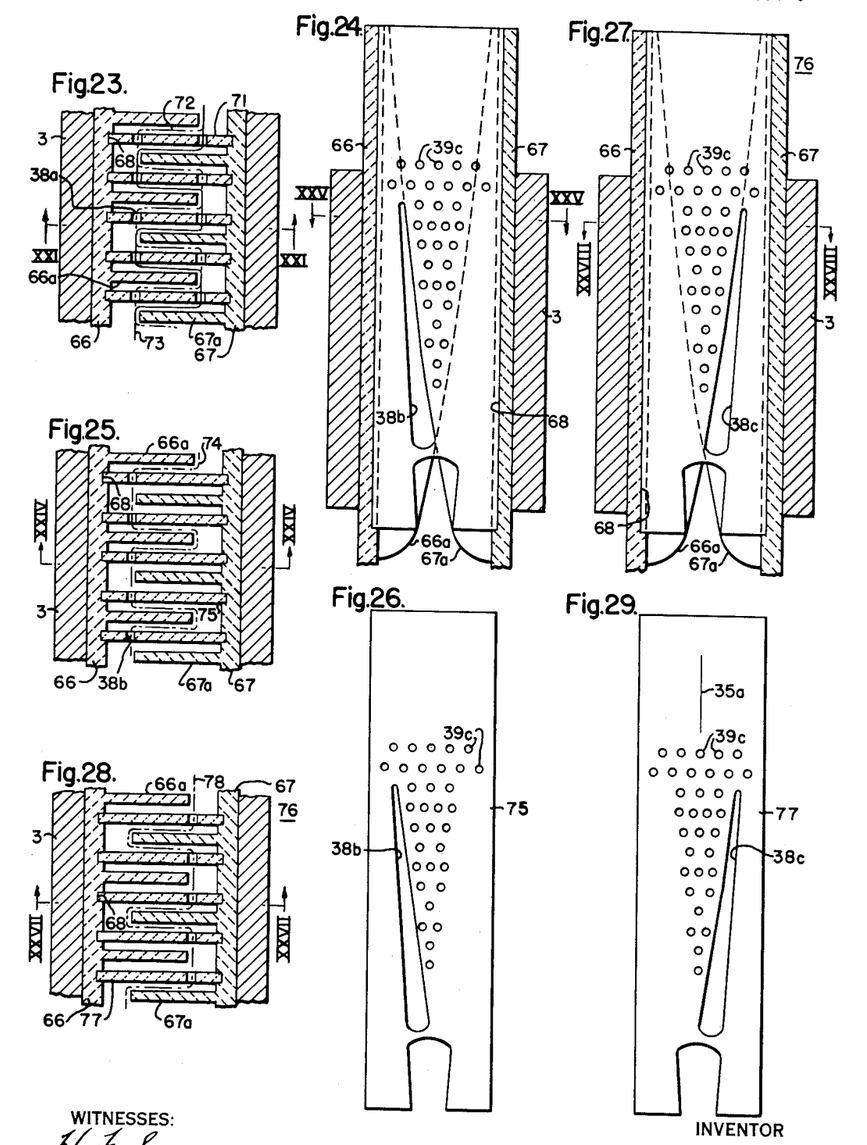
Fig. 23 is a plan view, in section, taken along the line XXIII—XXIII of Fig. 21.
Fig. 24 is a vertical sectional view of a further embodiment of my invention taken along the line XXIV—XXIV of Fig. 25.
Fig. 25 is a plan view, in section, taken along the line XXV—XXV of Fig. 24, looking in the direction of the arrows.
Fig. 26 is a side elevational view of a plate detail utilized in the construction set forth in Figs. 24 and 25.
Fig. 27 is a vertical sectional view of still another embodiment of my invention, taken along the line XXVII—XXVII of Fig. 28, looking in the direction of the arrows.
Fig. 28 is a plan view, in section, taken along the line XXVIII—XXVIII of Fig. 27, looking in the direction of the arrows.
Fig. 29 is a side elevational view of a plate detail utilized in the construction set forth in Figs. 27 and 28.

Referring to Fig. 23, it will be observed that the arc, upon moving upwardly, may take one of two different paths. One path is indicated by the broken line 72. The other path is indicated by the solid line 73. In either case, the arc is caused to intimately come into contact with the side wall surfaces of the intermediate plates 71. It will be observed that the number of interleaving fins 66a, 67a is cut down and the lateral offset distance increased. However, by virtue of the presence of a plurality of intermediate plates 71, the cooling action and the deionization brought to bear upon the arc is increased, regardless of the fact whether it takes the arc path 72 or the arc path 73.

The construction set forth in Figs. 24–26 is similar to that set forth in Figs. 21–23, but instead of employing an intermediate splitter plate 71 with two diverging slots 38a formed therein, instead, a plate of the type set forth in Fig. 26 is employed. This insulating plate is designated by the reference character 75 and has a single slot 38b provided therein. Also, apertures 39c are employed. By inserting the plurality of intermediate plates 75 into the grooves 68 provided in the side wall members 66, 67, the resulting construction is more clearly shown in Figs. 24 and 25.

In this construction, however, it will be observed that the arc is compelled to assume the path 74. No alternative path is provided. Here again the number of interleaving fins 66a, 67a are cut down with a corresponding increase of lateral offset distance. The plates 75 do not cause the arc stream to reverse its direction, but their presence brings about an intensive cooling and deionization of the arc stream 74.

Referring to the construction set forth in Figs. 27–29, it will be apparent that the modified type of arc chute 76 consists of employing plates of the type designated by the reference character 77 of Fig. 29. It will be observed that the plates 77 have a configuration similar to the plates 75 of Fig. 26, but the slot 38c is disposed on the opposite side of the centerline 35a of the plate. Again, the plates 77 are assembled in the grooves 68 of the side wall members 66, 67 so that the plates 77 cooperate with the fins 66a, 67a in a manner more clearly shown by reference to Fig. 28.

As was the case in the construction of Figs. 24–26, also in the construction of Figs. 27–29, the arc is compelled to assume a fixed arc path designated by the broken line 78 of Fig. 28.

The foregoing five constructions illustrate how certain features of my invention may be applicable to an arc chute of the interleaving fin type, in which the offset distance may be increased and more efficient deionization may be achieved by employing modified types of intermediate plates. The principles that are involved in the more efficient manner of arc extinction have previously been set forth in connection with the embodiment of my invention set forth in Figs. 1–5, and consequently will not again be repeated.

It is consequently, apparent that the principles of my invention are of wide application, whether applied to an arc chute of the type involving spaced plates having closed laterally offset slots provided therein, or whether the arc chute is of the type employing an interleaving fin construction.

Although I have shown and described specific structures, it is to be clearly understood that the same were merely for the purpose of illustration and that changes and modifications may readily be made therein by those skilled in the art without departing from the spirit and scope of the appended claims.

I claim as my invention:

1. A circuit interrupter comprising: means for establishing an arc; an arc chute in which the arc is moved including a plurality of spaced slotted plates, the slot in each plate being tapered and having one end closed and laterally offset from the centerline of the plate, the slot in one plate diverging in the direction of the exhaust end of the arc chute from the slots in the immediately adjacent plates, the offset slots being staggered laterally at the said one end thereof so as to form a zigzag arc passage along the length of the arc chute; a plurality of intermediate plates, each of which is disposed between a pair of the first said plates and spaced therefrom, each intermediate plate having a pair of diverging slots disposed therein, the closed end portions of which adjacent the exhaust end of the arc chute are in substantial alignment with the closed end portions of the diverging slots of the adjacent first plates.

2. A circuit interrupter comprising: means for establishing an arc; an arc chute in which the arc is moved including a plurality of spaced slotted plates, the slot in each plate being tapered and having one end closed and laterally offset from the centerline of the plate, the slot in one plate diverging in the direction of the exhaust end of the arc chute from the slots in the immediately adjacent plates, the offset slots being staggered laterally at the said one end thereof so as to form a zigzag arc passage along the length of the arc chute; a plurality of intermediate plates, each of which is disposed between a pair of the first said plates and spaced therefrom, each intermediate plate having a pair of diverging slots disposed therein, the closed end portions of the diverging slots of the adjacent first plates, and the in substantial alignment with the closed end portions of the diverging slots of the adjacent first plates, and the intermediate plates having a plurality of gas relieving apertures disposed therein.

3. A circuit interrupter comprising: means for establishing an arc; an arc chute in which the arc is moved including a plurality of spaced slotted insulating plates, the slot in each plate being tapered and having one end closed and laterally offset from the centerline of the plate, the slot in one plate diverging in the direction of the exhaust end of the arc chute from the slots in the immediately adjacent plates, the offset slots being staggered laterally at the said one end thereof so as to form a zig-zag arc passage along the length of the arc chute; a plurality of intermediate plates, each of which is disposed between a pair of the first said plates and spaced therefrom, each intermediate plate having at least one notch of relatively slight depth at the arc-striking edge thereof, and the depth of said notch being considerably less than the depth of the slots in the first said slotted plates.

4. A circuit interrupter comprising: means for establishing an arc; an arc chute in which the arc is moved including a plurality of spaced slotted insulating plates, the slot in each plate being tapered and having one end closed and laterally offset from the centerline of the plate, the slot in one plate diverging in the direction of the exhaust end of the arc chute from the slots in the immediately adjacent plates, the offset slots being staggered laterally at the said one end thereof so as to form a zigzag arc passage along the length of the arc chute; a plurality of insulating intermediate plates, each of which is disposed between an adjoining pair of the first said plates and spaced therefrom, each intermediate plate presenting an arc-striking edge to the arc but not interfering with its zigzag formation, and the intermediate plates having a plurality of gas relieving apertures disposed therein.

5. A circuit interrupter comprising: means for establishing an arc; an arc chute in which the arc is moved as a single arc including a plurality of spaced slotted insulating plates, the slot in each insulating plate being tapered and having one end closed and laterally offset from the centerline of the plate, the slot in one plate diverging in the direction of the exhaust end of the arc chute from the slots in the immediately adjacent plates, the offset slots being staggered laterally at the said one end thereof so as to form a zigzag arc passage along the length of the arc chute; a plurality of intermediate insulating plates, each of which is disposed between a pair of the first said plates and spaced therefrom, each insulating intermediate plate having at least one slot disposed therein, the closed end portion of which adjacent the exhaust end of the arc is in substantial alignment with the closed end portion of the diverging slot of one of the adjacent first plates.

6. A circuit interrupter comprising: means for establishing an arc; an arc chute in which the arc is moved including a plurality of spaced slotted plates, the slot in each plate being tapered and having one end closed and laterally offset from the centerline of the plate, the slot in one plate diverging in the direction of the exhaust end of the arc chute from the slots in the immediately adjacent plates, the offset slots being staggered laterally at the said one end thereof so as to form a zigzag arc passage along the length of the arc chute; a plurality of intermediate plates, each of which is disposed between a pair of the said plates and spaced therefrom, each intermediate plate having at least one slot disposed therein, the closed end portion of which adjacent the exhaust end of the arc chute is in substantial alignment with the closed end portion of the diverging slot of one of the adjacent first plates, and the intermediate plates having a plurality of gas relieving apertures disposed therein.

7. A circuit interrupter comprising: means for establishing an arc; an arc chute in which the arc is moved including a plurality of spaced slotted insulating plates; a plurality of intermediate plates disposed at intervals between adjoining first said plates and spaced therefrom, and each intermediate plate having a plurality of gas-relieving apertures therein, at least a plurality of said apertures in the intermediate plates being positioned below the upper closed ends of the slots in the first said plates, and said intermediate plates having the apertures cooling the arc gases and aiding in preventing movement of the arc through the arc chute.

8. A circuit interrupter including means for establishing an arc, an arc chute for extinguishing the arc comprising a pair of spaced wall members, insulating plate portions extending inwardly in staggered relation from the spaced inner walls of said spaced wall members, each plate portion having an edge portion which slants toward the opposite wall member so that portions of the arc in moving through the arc chute are forced in opposite lateral directions to assume a zigzag configuration, a plurality of intermediate insulating plate portions, at least one intermediate plate portion being positioned between adjoining first said plate portions and spaced therefrom, said intermediate plate portions each presenting an arc-striking edge to the arc but not interfering with its lateral zigzag formation, and said intermediate plate portions each having a plurality of gas relieving apertures therein below the upper ends of said slanting edge portions of the first said plate portions and said intermediate plate portions having the apertures cooling the arc gases.

9. A circuit interrupter including means for establishing an arc, an arc chute for extinguishing the arc comprising a pair of spaced wall members, plate portions extending inwardly in staggered relation from the spaced inner walls of said spaced wall members, each plate portion having an edge portion which slants toward the opposite wall member so that the arc in moving through the arc chute is forced to assume a zigzag configuration, and an intermediate plate between each pair of immediately adjacent plate portions extending across the arc chute and having at least one slanting slot disposed therein, one side edge of said slanting slot registering with an edge portion of at least one of said immediately adjacent plate portions.

10. A circuit interrupter including means for establishing an arc, an arc chute for extinguishing the arc comprising a pair of spaced wall members, plate portions extending inwardly in staggered relation from the spaced inner walls of said spaced wall members, each plate portion having an edge portion which slants toward the opposite wall member so that the arc in moving through the arc chute is forced to assume a zigzag configuration, an intermediate plate between each pair of immediately adjacent plate portions extending across the arc chute and having a pair of diverging slots provided therein, diverging in a direction toward the exhaust end of the arc chute, and one side of each of said slots registering with at least an edge portion of an immediately adjacent plate portion.

11. A circuit interrupter including means for establishing an arc, an arc chute for extinguishing the arc comprising a pair of spaced wall members, plate portions extending inwardly in staggered relation from the spaced inner walls of said spaced wall members, each plate portion having an edge portion which slants toward the opposite wall member so that the arc in moving through the arc chute is forced to assume a zigzag configuration, an intermediate plate between each pair of immediately adjacent plate portions extending across the arc chute and having at least one slanting slot disposed therein, one side edge of said slanting slot registering with an edge portion of at least one of said immediately adjacent plate portions, and each intermediate plate having a plurality of gas-relieving apertures provided therein.

12. A circuit interrupter including means for establishing an arc, an arc chute for extinguishing the arc comprising a pair of spaced wall members, plate portions extending inwardly in staggered relation from the spaced inner walls of said spaced wall members, each plate portion having an edge portion which slants toward the opposite wall member so that the arc in moving through the arc chute is forced to assume a zigzag configuration, an intermediate plate between each pair of immediately adjacent plate portions extending across the arc chute and having a pair of diverging slots provided therein, diverging in a direction toward the exhaust end of the arc chute, one side of each of said slots registering with at least an edge portion of an immediately adjacent plate portion, and each intermediate plate having a plurality of gas-relieving apertures provided therein.

13. A circuit interrupter comprising: means for establishing an arc; an arc chute in which the arc is moved including a plurality of spaced slotted plates, the slot in each plate being tapered and having one end closed and laterally offset from the centerline of the plate, the slot in one plate diverging in the direction of the exhaust end of the arc chute from the slots in the immediately adjacent plates, the offset slots being staggered laterally at the said one end thereof so as to form a zigzag arc passage along the length of the arc chute; a plurality of intermediate plates, each of which is disposed between a pair of the first said plates and spaced therefrom, and each intermediate plate having a pair of diverging slots disposed therein.

14. A circuit interrupter comprising: means for establishing an arc; an arc chute in which the arc is moved including a plurality of spaced slotted plates, the slot in each plate being tapered and having one end closed and laterally offset from the centerline of the plate, the slot in one plate diverging in the direction of the exhaust end of the arc chute from the slots in the immediately adjacent plates, the offset slots being staggered laterally at the said one end thereof so as to form a zigzag arc passage along the length of the arc chute; a plurality of intermediate plates, each of which is disposed between a pair of the first said plates and spaced therefrom, each intermediate plate having a pair of diverging slots disposed therein, and the intermediate plates having a plurality of gas relieving apertures disposed therein.

15. A circuit interrupter comprising: means for establishing an arc; an arc chute in which the arc is moved as a single arc including a plurality of spaced slotted insulating plates, the slot in each insulating plate being tapered and having one end closed and laterally offset from the centerline of the plate, the slot in one plate diverging in the direction of the exhaust end of the arc chute from the slots in the immediately adjacent plates, the offset slots being staggered laterally at the said one end thereof so as to form a zigzag arc passage along the length of the arch chute; a plurality of intermediate insulating plates, each of which is disposed between an adjoining pair of the first said plates and spaced therefrom, and each intermediate plate having at least one slot disposed therein, which substantially registers with the slot of an adjoining plate so that one loop of the zigzag arc includes the sides of the two slots of the intermediate plate and said last-mentioned adjoining plate.

16. A circuit interruptor comprising: means for establishing an arc; an arc chute in which the arc is moved including a plurality of spaced slotted plates, the slot in each plate being tapered and having one end closed and laterally offset from the centerline of the plate, the slot in one plate diverging in the direction of the exhaust end of the arc chute from the slots in the immediately adjacent plates, the offset slots being staggered laterally at the said one end thereof so as to form a zigzag arc passage along the length of the arc chute; a plurality of intermediate plates, each of which is disposed between a pair of the first said plates and spaced therefrom, each intermediate plate having at least one slot disposed therein, and the intermediate plates having a plurality of gas relieving apertures disposed therein at positions lower than the closed ends of the offset slots in the first said plates.

17. A circuit interrupter including an arc chute, means for establishing an arc adjacent one end of the arc chute for movement into the arc chute, said arc chute including a plurality of plate portions of insulating material extending transversely of the arc and formed to provide elongated slots extending into the arc chute from the end at which the arc is established and having no other apertures therein above the upper ends of said slots, a plurality of plate portions of insulating material each having a plurality of apertures therein and relatively smaller slots, said plate portions having apertures being positioned at intervals between the first said plate portions, and the said elongated slots provided by the first said plate portions extending into the arc chute beyond the smaller slots in the second-mentioned plate portions.

18. A circuit interrupter including an arc chute, means for establishing an arc adjacent one end of the arc chute for movement into the arc chute, said arc chute including a plurality of plate portions of insulating material extending transversely of the arc and formed to provide elongated slots extending into the arc chute from the end at which the arc is established, said elongated slots being tapered with their widest portion adjacent the end of the arc chute at which the arc is established, a plurality of plate portions of insulating material each having a plurality of apertures therein and relatively smaller tapered slots, said apertures in the plate portions being irregularly spaced in a non-linear manner, said plate portions having apertures being positioned at intervals between the first said plate portions, and the said elongated slots provided by the first said plate portions extending into the arc chute beyond the smaller tapered slots in the plate portions provided therewith.

19. A circuit interrupter including means for establishing an arc, an arc chute for extinguishing the arc including a pair of spaced wall members, plate portions extending inwardly in staggered relation from the spaced inner walls of said spaced wall members, each plate portion having an edge portion which slants toward the opposite wall member across the median plane of the arc chute so that the arc in moving through the arc chute is forced to assume a sinuous configuration, and at least one other intermediate plate portion disposed between a pair of adjoining first said plate portions and spaced therefrom, said other intermediate plate portion having an edge portion adjacent the edge portion of one of said pair of plate portions and slanting in substantially the same direction, the result being that one loop of the sinuous arc includes the edge portions of two adjoining plate portions.

20. A circuit interrupter including means for establishing an arc, an arc chute for extinguishing the arc including a pair of spaced wall members, plate portions extending inwardly in staggered relation from the spaced inner walls of said spaced wall members, each plate portion having an edge portion which slants toward the opposite wall member across the median plane of the arc chute so that the arc in moving through the arc chute is forced to assume a sinuous configuration, and at least one other intermediate plate portion disposed between a pair of adjoining first said plate portions and spaced therefrom, said other intermediate plate portion having an edge portion generally along the edge portion of one of said pair of plate portions and slanting in substantially the same direction, the result being that one loop of the sinuous arc includes the edge portions of two adjoining plate portions, and said other intermediate plate portion having a plurality of gas relieving apertures.

21. A circuit interrupter including means for establishing an arc, an arc chute for extinguishing the arc including a pair of spaced wall members, plate portions extending inwardly in staggered relation from the spaced inner walls of said spaced wall members, each plate portion having an edge portion which slants toward the opposite wall member across the median plane of the arc chute so that the arc in moving through the arc chute is forced to assume a sinuous configuration, and at least one other intermediate plate portion disposed between a pair of adjoining first said plate portions and spaced therefrom, said other intermediate plate portion having at least one notch of relatively slight depth at the arc-striking edge thereof, and the depth of said notch being considerably less than the length through the arc chute of the slanted edge portions of the first said plate portions.

22. A circuit interrupter including means for establishing an arc, an arc chute for extinguishing the arc including a pair of spaced wall members, plate portions extending inwardly in staggered relation from the spaced inner walls of said spaced wall members, each plate portion having an edge portion which slants toward the opposite wall member across the median plane of the arc chute so that the arc in moving through the arc chute is forced to assume a sinuous configuration, at least one other intermediate plate portion disposed between a pair of adjoining first said plate portions and spaced therefrom, said other intermediate plate portion having at least one notch of relatively slight depth at the arc-striking edge thereof, the depth of said notch being considerably less than the length through the arc chute of the slanted edge portions of the first said plate portions, and said other intermediate plate portion having a plurality of gas relieving apertures above the top of said notch and below the level of the tops of the slanting edge portions of the first said plate portions.

23. A circuit interrupter comprising: means for establishing an arc; an arc chute in which the arc is moved including a plurality of spaced slotted insulating plates, the slot in each plate being tapered and having one end closed and laterally offset from the centerline of the plate, the slot in one plate diverging in the direction of the exhaust end of the arc chute from the slots in the immediately adjacent plates, the offset slots being staggered laterally at the said one end thereof so as to form a zigzag arc passage along the length of the arc chute, and a plurality of the aforesaid slotted plates being substantially whole above the upper ends of the offset slots; a plurality of intermediate plates, each of which is disposed between a pair of the first said plates and spaced therefrom, each intermediate plate having at least one notch of relatively slight depth at the arc-striking edge thereof, and the depth of said notch being considerably less than the depth of the slots in the first said slotted plates, and a plurality of said intermediate plates having perforations therein at least in the portion thereof defined by the difference between the said different depths.

24. A circuit interrupter comprising: means for establishing an arc; an arc chute in which the arc is moved including a plurality of spaced slotted insulating plates, the slots in a plurality of said plates having their upper closed ends offset from the centerline of the plates, and the upper closed ends of said slots in some of the plates being offset to one side of the centerline and in other of the plates being offset to the other side of the centerline; a plurality of insulating intermediate plates disposed at intervals between adjoining first said plates and spaced therefrom, and each intermediate plate having a plurality of gas-relieving apertures therein, at least a plurality of said apertures in the intermediate plates being positioned below the upper closed ends of the slots in the first said plates, and said intermediate plates having the apertures cooling the arc gases and aiding in preventing movement of the arc through the arc chute.

25. A circuit interrupter comprising: means for establishing an arc; an arc chute in which the arc is moved including a plurality of spaced slotted plates, the slot in each plate being tapered and having one end closed and laterally offset from the centerline of the plate, the slot in one plate diverging in the direction of the exhaust end of the arc chute from the slots in the immediately adjacent plates, the offset slots being staggered laterally at the said one end thereof so as to form a zigzag arc passage along the length of the arc chute and the aforesaid plates having no apertures therein above the closed ends of the offset slots; a plurality of intermediate plates, each of which is disposed between a pair of the first said plates and spaced therefrom, each intermediate plate having at least one slot disposed therein, and the intermediate plates having a plurality of gas relieving apertures disposed therein at positions lower than the closed ends of the offset slots in the first said plates.

26. A circuit interrupter including an arc chute, means for establishing an arc adjacent one end of the arc chute for movement into the arc chute, said arc chute including a plurality of plate portions of insulating material extending transversely of the arc and formed to provide elongated slots extending into the arc chute from the end at which the arc is established, said elongated slots in some of said plate portions being offset to one side of the centerline of the plates and in other of said plate portions being offset to the other side of the said centerline, a plurality of plate portions of insulating material each having a plurality of apertures therein and relatively smaller slots, said plate portions having apertures being positioned at intervals between the first said plate portions, and the said elongated slots provided by the first said plate portions extending into the arc chute beyond the smaller slots in the second-mentioned plate portions and a plurality of the apertures in the second-mentioned plate portions being below the offset ends of said elongated slots in the first said plate portions.

References Cited in the file of this patent

UNITED STATES PATENTS

| | | |
|---|---|---|
| 1,840,292 | Slepian | Jan. 5, 1932 |
| 2,140,360 | Jennings | Dec. 13, 1938 |
| 2,244,061 | Graves, Jr. | June 3, 1941 |
| 2,442,199 | Dickinson et al. | May 25, 1948 |
| 2,477,189 | Lerstrup | July 26, 1949 |

FOREIGN PATENTS

| | | |
|---|---|---|
| 797,227 | France | Feb. 8, 1936 |